United States Patent [19]

Caine

[11] Patent Number: 4,994,822

[45] Date of Patent: Feb. 19, 1991

[54] PULSE COUNT MODULATION FOR THERMAL PRINTING

[75] Inventor: Holden Caine, Rochester, N.Y.

[73] Assignee: Eastman Kodak Company, Rochester, N.Y.

[21] Appl. No.: 527,920

[22] Filed: May 24, 1990

[51] Int. Cl.$^5$ .............................................. G01D 15/10
[52] U.S. Cl. ................................ 346/76 PH; 358/298; 400/120
[58] Field of Search .................... 346/76 PH; 358/298; 400/120

[56] References Cited

U.S. PATENT DOCUMENTS

| 4,806,949 | 2/1989 | Onuma et al. | 346/76 PH |
| 4,806,950 | 2/1989 | Sekine et al. | 366/76 PH |
| 4,951,152 | 8/1990 | Suzuki et al. | 346/76 PH |

Primary Examiner—Bruce A. Reynolds
Assistant Examiner—Huan Tran
Attorney, Agent, or Firm—Raymond L. Owens

[57] ABSTRACT

A pulse modulation scheme for a thermal printer having pulses which have three different widths.

1 Claim, 5 Drawing Sheets

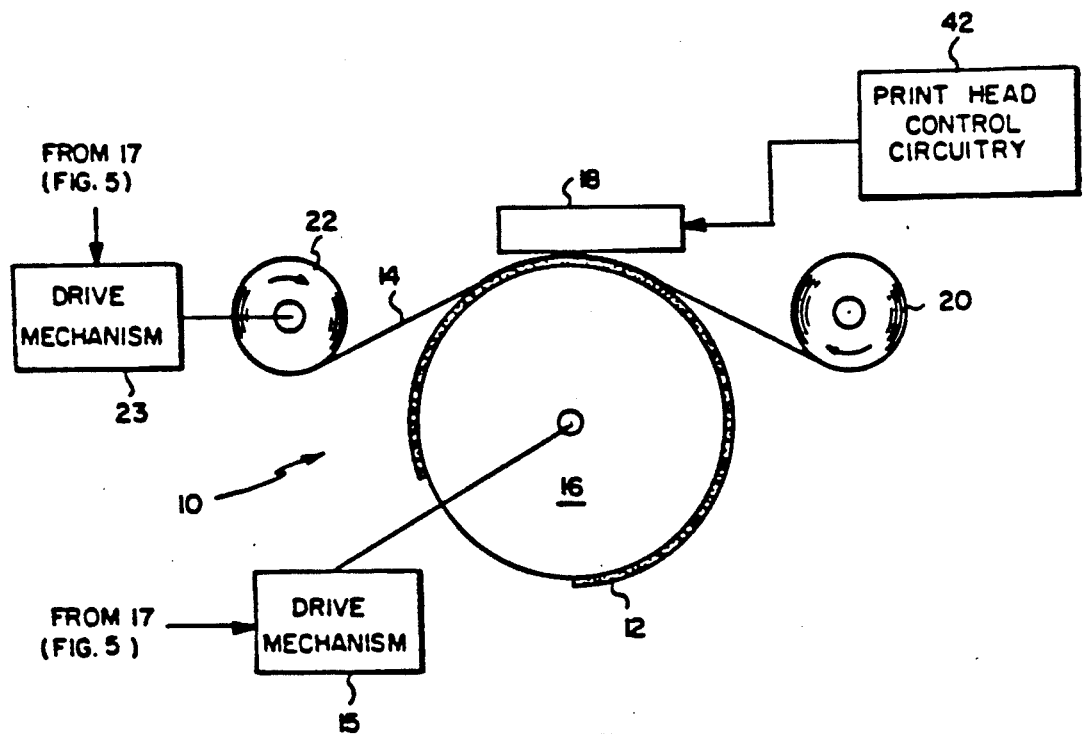
FIG. 1
FIG. 2
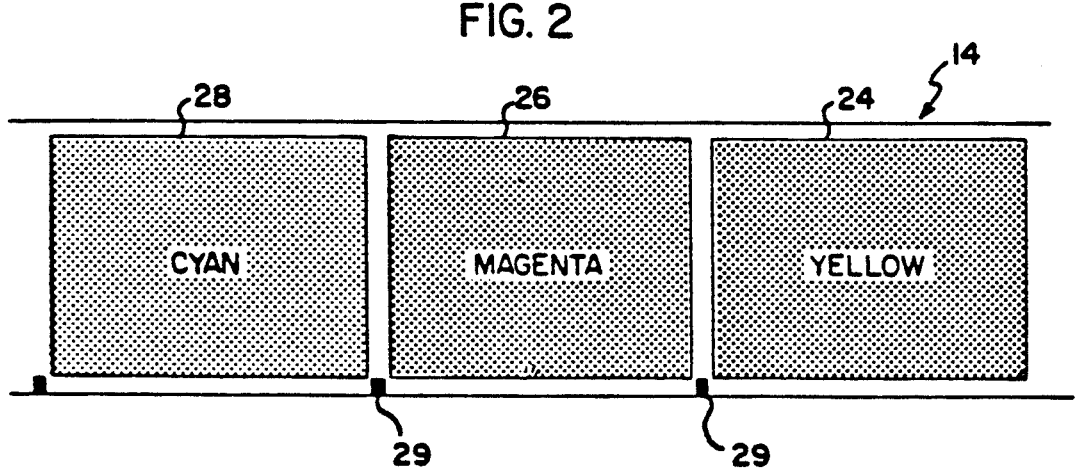

PULSE COUNT MODULATION FOR THERMAL PRINTING

BACKGROUND OF THE INVENTION

1. Field of the Invention

The present invention relates to continuous tone color thermal printers and, more particularly, to pulse count modulation for such printers.

2. Description of the Prior Art

Some thermal printer apparatus use a dye transfer process. In this process, a carrier containing a dye is disposed between a receiver, such as paper, and a print head formed of, for example a plurality of individual thermal heat producing elements often referred to as heating elements or pixels. The receiver and carrier are generally moved relative to the print head which is fixed. When a particular heating element is energized, it is heated and causes dye to transfer, e.g. by sublimation (from the carrier to an image pixel in the receiver). The density or darkness of the printed dye is a function of the temperature of the heating element and the time the carrier is heated. In other words, the heat delivered from the heating element to the carrier causes dye to transfer to an image pixel of a receiver. The amount of dye is directly related to the amount of heat transferred to the carrier.

Thermal dye transfer printer apparatus offer the advantage of true "continuous tone" dye density transfer. By varying the heat applied by each heating element to the carrier a variable dye density image pixel is formed in the receiver.

Continuous tone thermal printers are used to print color images. First a cyan image is printed and then magenta and yellow images are superimposed on the cyan image to form a colored image as shown in FIGS. 1-4 of this application. Any order of printing can be used. Pulse count modulation is often used to provide continuous tone thermal prints. The heat delivered is adjusted by changing the number of pulses applied to each heating element. As shown in FIG. 4, in such a system the pulses have a constant current at a fixed width. In FIG. 4 for purposes of illustration there are only a maximum of four possible pulses. Only one pulse is activated, then the image pixel will have 25% of the maximum density. If two pulses are activated it will have 50%. If three pulses are activated it will have 75% and if all four pulses are activated it will have 100%. Let's assume for a more practical example that the maximum dye density pixel receives 200 pulses. There are then 201 discrete dye density levels since a heating element may receive anywhere between 0 and 200 pulses. U.S. Pat. No. 4,806,949 to Onuma et al discloses a pulse count modulation scheme for printing a multiple tone image with two signals. In this disclosure, the first signal corresponds to the least significant bit of the digital tone data. The second signal is comprised of a series of pulses, each pulse being twice as long in duration as the first signal. The number of pulses in the second signal corresponds to the digital tone data, excluding the least significant bit. The addition of the first signal effectively doubles the number of energy levels (corresponding to density levels) achieved by the pulses in the second signal.

SUMMARY OF THE INVENTION

It is an object of this invention to provide simple but effective pulse count modulation for a thermal printer which provides enhanced continuous tone dye density images.

This object is achieved in a continuous tone color thermal apparatus including a print head having a plurality of heating elements for printing a line at a time of image pixels, each heating heating element being selectively energized in response to a digital dye density word signal to apply heat to a carrier having dye to cause such dye to transfer to a receiver to form a dye image pixel in a line, each dye image pixel having a density which is a function of the value of its corresponding digital dye density word signal, the improvement comprising means responsive to the significant digits of the digital dye density word signal to provide a selected number of constant current pulses having a first width (PCM); and means responsive to at least two least significant digits of the digital density dye word signal to selectively provide at least two constant current pulses having second and third different widths respectively, both of such second and third widths being smaller than the first width.

A feature of this invention is that it permits a reduction in the number of times a thermal print head heating element is energized to achieve a desired number of dye density levels. The printing time for a colored image is thereby significantly reduced.

BRIEF DESCRIPTION OF THE DRAWINGS

FIG. 1 is a schematic of a thermal printer apparatus which can be employed to make continuous tone dye images in accordance with the invention;

FIG. 2 is a top view of a carrier for use in the thermal printer of FIG. 1;

DESCRIPTION OF THE PREFERRED EMBODIMENT

Figure 3:
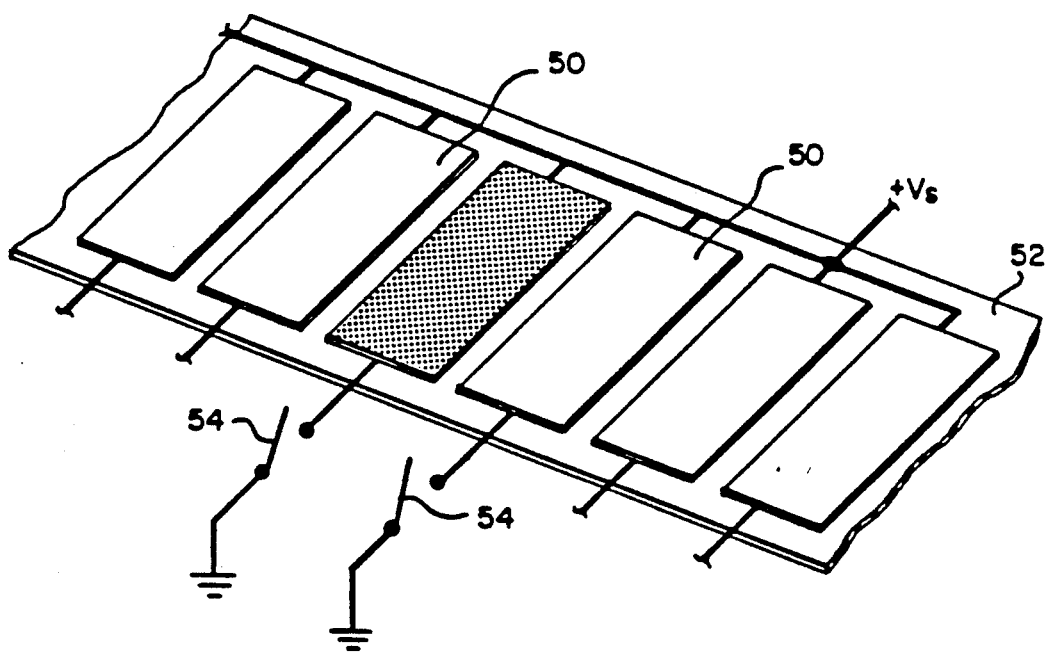
FIG. 3 is a perspective of several heating elements used in the print head of the thermal printer apparatus of FIG. 1.
Figure 4:
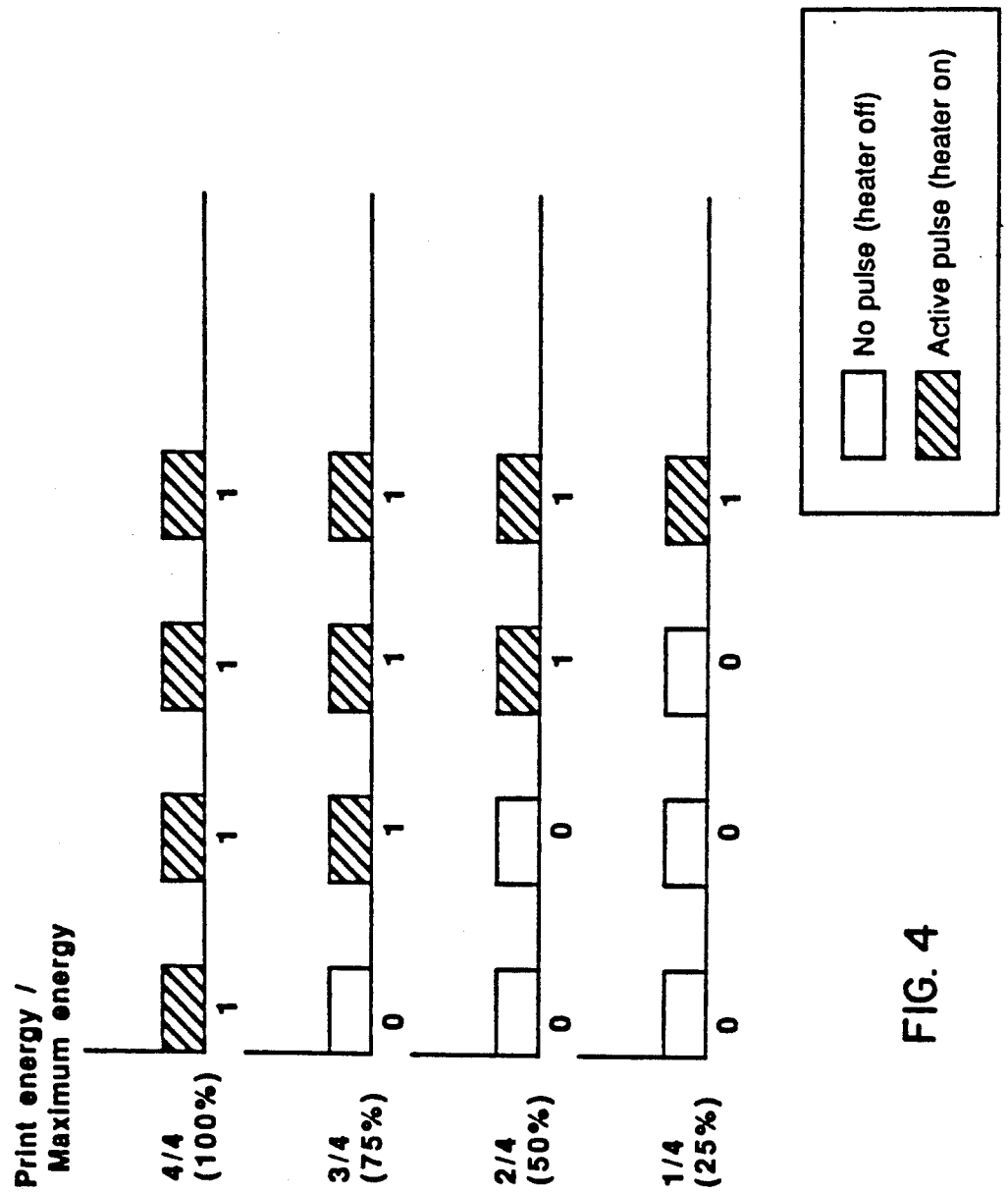
FIG. 4 shows a conventional pulse count modulation scheme wherein there are maximum of four pulses for each image pixel.

Referring now to FIG. 1, there is shown a thermal printer apparatus 10 which is adapted to print color images on a receiver 12 from dyes transferred from a carrier 14. The receiver member 12 is in the form of a sheet. It is secured to rotatable drum 16 which is mechanically coupled to a drive mechanism 15. The drive mechanism 15 continuously advances the drum 16 and the receiver sheet 12 past a stationary thermal print head 18. The print head 18 has a plurality of heating elements (resistors) which are more clearly shown in FIG. 3. These heating elements are sometimes referred to as pixels. The heating elements press the carrier member 14 against the receiver sheet 12. The carrier member 14 is shown in the form a web and is driven from a supply roller 20 onto a take up roller 22 by a drive mechanism 23 coupled to the take up roller 22. The drive mechanisms 15 and 23, each include motors. These motors continuously advance the carrier and receiver respectively, relative to the heating elements of the print head 18. During printing, the heating elements are addressed and selectively energized as the carrier and receiver are continuously advanced. Accordingly, the resultant dye image pixel will be somewhat larger than if the carrier and the receiver were stationary during dye transfer. The movement of the carrier is necessary to reduce sticking of the carrier to the heating elements in the print head 18.

In FIG. 2, the carrier member 14 is shown in the form of a web with repeating series of sections or frames of thermally transferable dye. Each frame in a sequence has different color heat transferable dye. For example, each sequence or frames includes a of yellow thermal transferable dye 24, followed by a frame of magenta thermally transferable dye 26, followed by a from of cyan thermally transferable dye 28. This sequence of yellow, magenta and cyan dye frames is of course repeated. Reference marks 29 are shown which can be used in the well known manner to control the operation of the drive mechanisms 15 and 23.

With reference to FIG. 1, the operation of the apparatus will be described. Drive signals are continuously provided to the drive mechanism from a microcomputer (not shown) and rotate the drum 16 to bring successive areas of the receiver sheet 12 into the print region opposite print head 18. A portion of a dye frame of the carrier member 14 is disposed between the print head the receiver 12. Both the receiver and the carrier members are moved relative to the print head during this printing operation. Print head and control circuitry 24 includes a pulse count modulation (PCM) circuit (see FIG. 6) for applying pulses to the individual heating elements of the print head 18.

Figure 5:
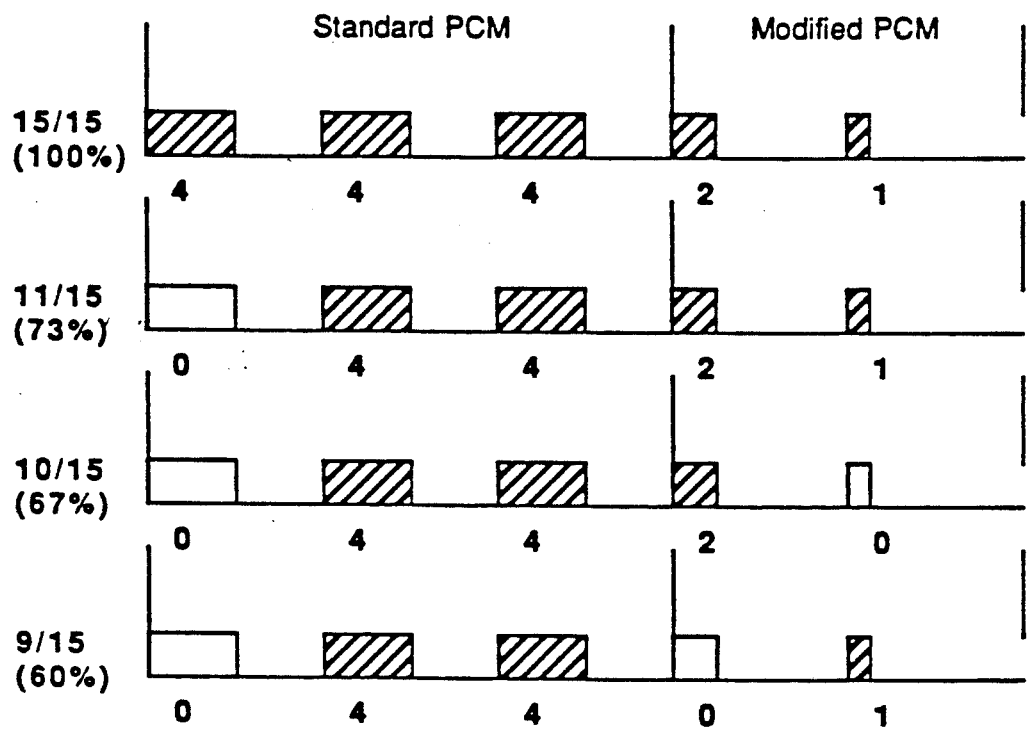
FIG. 5 shows a modified pulse count modulation scheme in accordance with the present invention.
Figure 5:
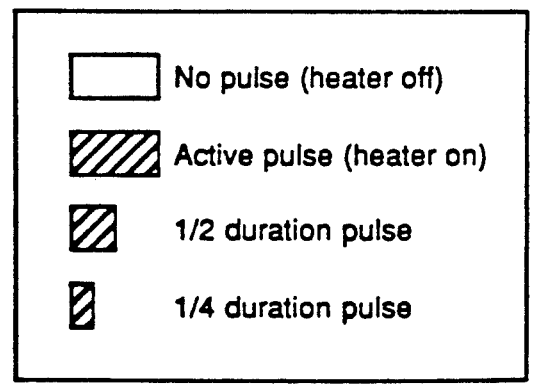
Figure 6:
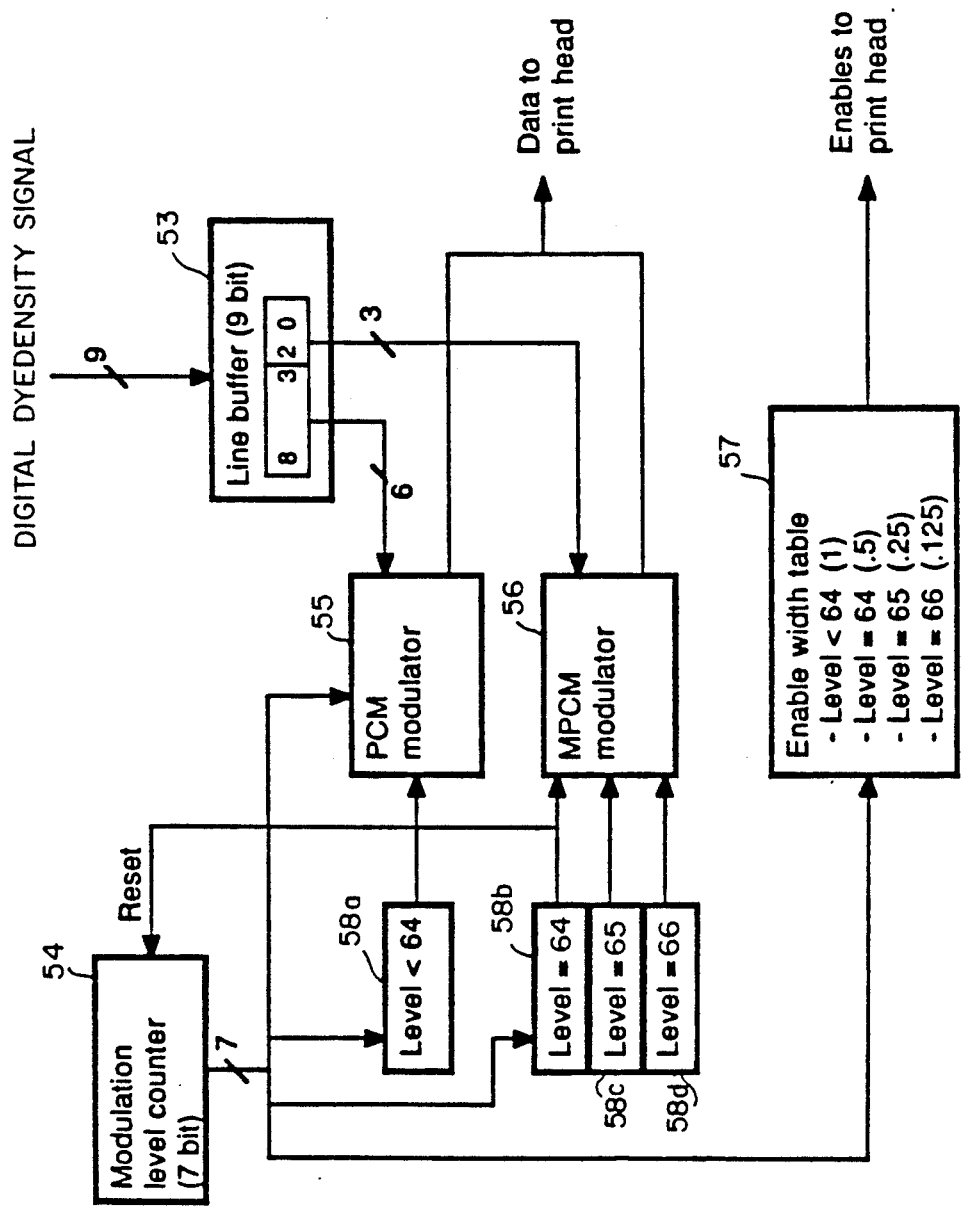
FIG. 6 is a detail of a control circuit found within the print head control circuit 42 of FIG. 1 which produces pulse count modulation in accordance with the present invention.

Before describing FIG. 6 we will first turn our attention to FIG. 5. In this example, there are a maximum of five pulses. These pulses correspond to 15 different dye density levels. There are three standard pulses of constant current (PCM) having a first width and two modified pulses having the same constant current level. One of the pulses is of one half the duration of the standard pulses and one of the pulses is of one quarter duration of the standard pulses. We will refer to this as a modified pulse count modulation (MPCM). As shown, if both modified pulses are activated or energized and two of the standard pulses are energized that would correspond to the 11th dye density level. If two standard pulses are energized and the one half duration modified pulse is energized that would correspond to the 10th dye density level, and if two standard pulses are energized and the one half and the one quarter duration modified pulses are energized that would correspond to the 11th dye density level. Similarly if two standard pulses and the one half duration modified pulse is energized that corresponds to the 10th dye density level.

Turning now to FIG. 6, an input digital dye density word signal has 9 digits. The six most significant digits will be applied to a pulse count modulator circuit, and the three least significant digits will be used to develop three modified pulse counts.

FIG. 6 shows an example of a 9 bit (512 level) continuous tone modified pulse count modulator. This is accomplished in sixty seven modulation levels, numbered zero through sixty six. A line buffer 53 holds as many nine bit values as there are pixels in the print head. The modulation level counter 54 determines which of the sixty seven modulation levels are currently being processed.

Levels zero through sixty three are standard pulse count modulation levels as enabled respectively by blocks 58a. Each pixel in the print head is energized a number of times, as indicated by the most significant six bits of the corresponding digital dye density value stored in the line buffer. The width of each of these pulses is a constant value as determined by the enable width table 57. In this example, the pulse width is given a value of one.

Modulation levels sixty four through sixty six are the modified pulse count modulation levels (MPCM) enabled respectively by blocks 58b, 58c, and 58d. Each of these three levels correspond to one of the three least significant bits of the digital dye density values. For example, level 64 would correspond to bit 2 of the density value. Any pixel for which bit 2 is set would receive a pulse. The pulse width is half of the width of the pulses for the previous levels, as indicated by the enable width table, 57. Similarly, modulation levels sixty five and sixty six would correspond to bits 1 and 0, and would result in enable pulses of one quarter and one eighth, respectively. After modulation level sixty six, the line is complete and modulation of the next line may begin.

The total energy received by a pixel during one line is the sum of all pulse widths received. Levels zero through sixty three can each contribute a unit pulse to a pixel. Level sixty four can contribute one half of a unit pulse; level sixty five, one quarter; and level sixty six, one eighth. This results in 512 possible units of energy, corresponding to 9 bits of desired digital dye density.

Addition of energy for the partial pulses results in a certain amount of error. Energy is constantly being removed from the heaters by the donor material, the ceramic substrate and the air. Since the rate of energy loss is dependent on the energy level, and the resulting dye density is dependent on the amount of energy received by the donor over time, the partial pulses must occur quickly enough so that the error due to heat loss is negligible. This is the failure of straightforward binary modulation where each pulse width is one half the width of the previous pulse, corresponding to the next less significant bit of the desired density level. As more bits are used in the binary modulation scheme, the time between most significant and least significant pulses becomes long enough to result in significant errors in density.

The invention has been described in detail with particular reference to certain preferred embodiments thereof, but it will be understood that variations and modifications can be effected within the spirit and scope of the invention.

I claim:

1. In a continuous tone color thermal apparatus including a print head having a plurality of heating elements for printing a line at a time of image pixels, each heating element being selectively energized in response to a digital dye density word signal to apply heat to a carrier having dye to cause such dye to transfer to a receiver to form a dye image pixel of a line, each dye image pixel having a density which is a function of the value of its corresponding digital dye density word signal, the improvement comprising:
   (a) means responsive to significant digits of the digital dye density word signal to provide a selected number of constant current pulses having a first width (PCM); and
   (b) means responsive to at least two least significant digits of the digital density dye word signal to selectively provide at least two constant current pulses having second and third different widths respectively, both of such second and third widths being smaller than the first width.

* * * * *